US010528998B2

United States Patent
LaMontagne (10) Patent No.: US 10,528,998 B2
(45) Date of Patent: Jan. 7, 2020

(54) SYSTEMS AND METHODS FOR PRESENTING INFORMATION RELATED TO PRODUCTS OR SERVICES BEING SHOWN ON A SECOND DISPLAY DEVICE ON A FIRST DISPLAY DEVICE USING AUGMENTED REALITY TECHNOLOGY

(71) Applicant: Trivver, Inc., Huntington Beach, CA (US)

(72) Inventor: Joel LaMontagne, Huntington Beach, CA (US)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 15/950,716

(22) Filed: Apr. 11, 2018

(65) Prior Publication Data

US 2019/0318404 A1 Oct. 17, 2019

(51) Int. Cl.
*G06Q 30/06* (2012.01)
*G06T 19/00* (2011.01)
*H04L 29/08* (2006.01)

(52) U.S. Cl.
CPC ..... *G06Q 30/0623* (2013.01); *G06Q 30/0643* (2013.01); *G06T 19/006* (2013.01); *H04L 67/12* (2013.01)

(58) Field of Classification Search
CPC .................................................. G06T 19/006
USPC ....................................................... 345/633
See application file for complete search history.

(56) References Cited

U.S. PATENT DOCUMENTS

| | | | | |
|---|---|---|---|---|
| 6,828,966 | B1* | 12/2004 | Gavriliu | G06T 17/20 345/420 |
| 9,536,251 | B2* | 1/2017 | Huang | G06Q 30/0255 |
| D817,988 | S * | 5/2018 | LaMontagne | D14/486 |
| 10,166,473 | B2* | 1/2019 | Wong | A63F 13/5255 |
| 2007/0098234 | A1* | 5/2007 | Fiala | G06K 9/3216 382/120 |
| 2009/0138813 | A1* | 5/2009 | LaMontagne | A63F 13/79 715/771 |
| 2010/0048290 | A1* | 2/2010 | Baseley | A63F 13/10 463/25 |
| 2012/0275755 | A1* | 11/2012 | Southworth | G06T 19/006 386/200 |
| 2013/0293580 | A1* | 11/2013 | Spivack | G06Q 30/0643 345/633 |

(Continued)

OTHER PUBLICATIONS

"Multi-Device Mixed Reality TV" Caroline Baillard et al., Nov. 8-10, 2017, Gothenburg, Sweden.*

(Continued)

*Primary Examiner* — Javid A Amini
(74) *Attorney, Agent, or Firm* — Chhabra Law Firm, PC (57) ABSTRACT

Systems and methods for presenting information, related to products or services being shown on a second display device, on a first display device using augmented reality technology are disclosed. Exemplary implementations may: receive a request, by a server, from a processing system coupled to the first display device, to display information related to a product or service on an augmented reality marker present in a real-time or near real-time image generated or captured in a viewpoint of an image capturing system; determine the product or service being shown on the second display device; and transmit information related to the product or service.

17 Claims, 7 Drawing Sheets

(56) References Cited

U.S. PATENT DOCUMENTS

| | | | | |
|---|---|---|---|---|
| 2014/0114742 A1* | 4/2014 | LaMontagne | ...... | G06Q 30/0242 705/14.41 |
| 2014/0247278 A1* | 9/2014 | Samara | ...... | G06T 11/00 345/633 |
| 2014/0267399 A1* | 9/2014 | Zamer | ...... | H04L 67/20 345/633 |
| 2015/0035823 A1* | 2/2015 | Arsan | ...... | G06T 15/20 345/419 |
| 2015/0228122 A1* | 8/2015 | Sadasue | ...... | G06T 19/006 345/633 |
| 2016/0086365 A1* | 3/2016 | Petti | ...... | G06T 13/00 345/474 |
| 2016/0293133 A1* | 10/2016 | Dutt | ...... | G06F 8/20 |
| 2017/0237899 A1* | 8/2017 | Wexler | ...... | H04L 65/4069 348/207.11 |
| 2017/0249745 A1* | 8/2017 | Fiala | ...... | G06K 9/00671 |
| 2018/0012234 A1* | 1/2018 | Kelly | ...... | G06Q 20/04 |
| 2018/0018696 A1* | 1/2018 | LaMontagne | ...... | G06Q 30/0251 |
| 2018/0018828 A1* | 1/2018 | LaMontagne | ...... | G06T 19/20 |
| 2018/0075883 A1* | 3/2018 | Aroyo | ...... | G11B 27/28 |
| 2018/0092698 A1* | 4/2018 | Chopra | ...... | G06F 1/163 |
| 2018/0096383 A1* | 4/2018 | LaMontagne | ...... | G06K 9/52 |
| 2018/0114247 A1* | 4/2018 | LaMontagne | ...... | G06Q 30/0251 |
| 2018/0121968 A1* | 5/2018 | LaMontagne | ...... | G06Q 30/0277 |
| 2019/0043269 A1* | 2/2019 | Lin | ...... | G06T 17/00 |

OTHER PUBLICATIONS

An Outlook for Content UX in TV: The Emergence of Augmented Content, CHI 2015, Crossings, Seoul, Korea.*

A Second-Screen Meets Hypervideo, Delivering Content Through HbbTV, TVX 2015, Jun. 3-5, 2015, Brussels, Belgium.*

3D Mobile Interactions for Public Displays Mayra Donaji Barrera Machuca, Winyu Chinthammit, Yi Yang and Henry Duh Human Interface Technology Laboratory, Australia, SIGGRAPH Asia 2014, Dec. 3-6, 2014.*

* cited by examiner

SYSTEMS AND METHODS FOR PRESENTING INFORMATION RELATED TO PRODUCTS OR SERVICES BEING SHOWN ON A SECOND DISPLAY DEVICE ON A FIRST DISPLAY DEVICE USING AUGMENTED REALITY TECHNOLOGY

RELATED APPLICATIONS

The present application is related to U.S. Design patent application Ser. No. 29/643,754, titled, "Display Panel Or Portion Thereof With Graphical User Interface For Transitional Augmented Reality Components," concurrently filed herewith. The subject matter of the above identified application is incorporated by reference hereto for all purposes to the extent that such subject matter is not inconsistent herewith.

FIELD OF THE DISCLOSURE

The present disclosure relates to systems and methods for presenting information, related to products or services being shown on a second display device, on a first display device using augmented reality technology.

BACKGROUND

Augmented reality technology assist in augmenting a virtual object on to a real image. For some organizations, it can be desirable to utilize this technology to display products or services.

SUMMARY

One aspect of the present disclosure relates to a system configured for presenting information, related to products or services being shown on a second display device, on a first display device using augmented reality technology. The system can include one or more hardware processors configured by machine-readable instructions. The processor(s) can be configured to receive a request, by a server, from a processing system coupled to the first display device, to display information related to a product or service on an augmented reality marker present in a real-time or near real-time image captured in a viewpoint of an image capturing system. The request can include identification information about a show or program channel on which the product or service is displayed on the second display device during a specific time period. The processing system can detect feature descriptors of the real-time or near real-time image to identify the augmented reality marker using at least one of corner detection, blob detection, edge detection or thresholding algorithm. The processor(s) can also be configured to further determine the product or service being shown on the second display device and transmit information related to the product or service, the information related to the product or service including a three dimensional artifact that is to be augmented at the augmented reality marker to the processing system.

The processing system may then be configured to augment the real-time or near real-time image comprising the augmented reality marker with information related to the product or service and displays the information related to the product or service, including the three dimensional artifact, at the augmented reality marker on the first display device.

Another aspect of the present disclosure relates to a method for presenting information, related to products or services being shown on a second display device, on a first display device using augmented reality technology. The method may include receiving a request, by a server, from a processing system coupled to the first display device, to display information related to a product or service on an augmented reality marker present in a real-time or near real-time image generated in a viewpoint of an image capturing system. The request may include identification information about a show or program channel on which the product or service is displayed on the second display device during a specific time period. The processing system may detect feature descriptors of the real-time or near real-time image to identify the augmented reality marker using at least one of corner detection, blob detection, edge detection or thresholding algorithm. The method may include determining the product or service being shown on the second display device. The method may include transmitting information related to the product or service. The information related to the product or service may include a three dimensional artifact that is to be augmented at the augmented reality marker to the processing system. The processing system may augment the image including the augmented reality marker with information related to the product or service and displays the information related to the product or service, including the three dimensional artifact, at the augmented reality marker on the first display device.

Yet another aspect of the present disclosure relates to a non-transitory computer-readable storage medium having instructions embodied thereon, the instructions being executable by one or more processors to perform a method for presenting information, related to products or services being shown on a second display device, on a first display device using augmented reality technology. The method may include receiving a request, by a server, from a processing system coupled to the first display device, to display information related to a product or service on an augmented reality marker present in a real-time or near real-time image generated in a viewpoint of an image capturing system. The request may include identification information about a show or program channel on which the product or service is displayed on the second display device during a specific time period. The processing system may detect feature descriptors of the real-time or near real-time image to identify the augmented reality marker using at least one of corner detection, blob detection, edge detection or thresholding algorithm. The method may include determining the product or service being shown on the second display device. The method may include transmitting information related to the product or service. The information related to the product or service may include a three dimensional artifact that is to be augmented at the augmented reality marker to the processing system. The processing system may augment the image including the augmented reality marker with information related to the product or service and displays the information related to the product or service, including the three dimensional artifact, at the augmented reality marker on the first display device.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
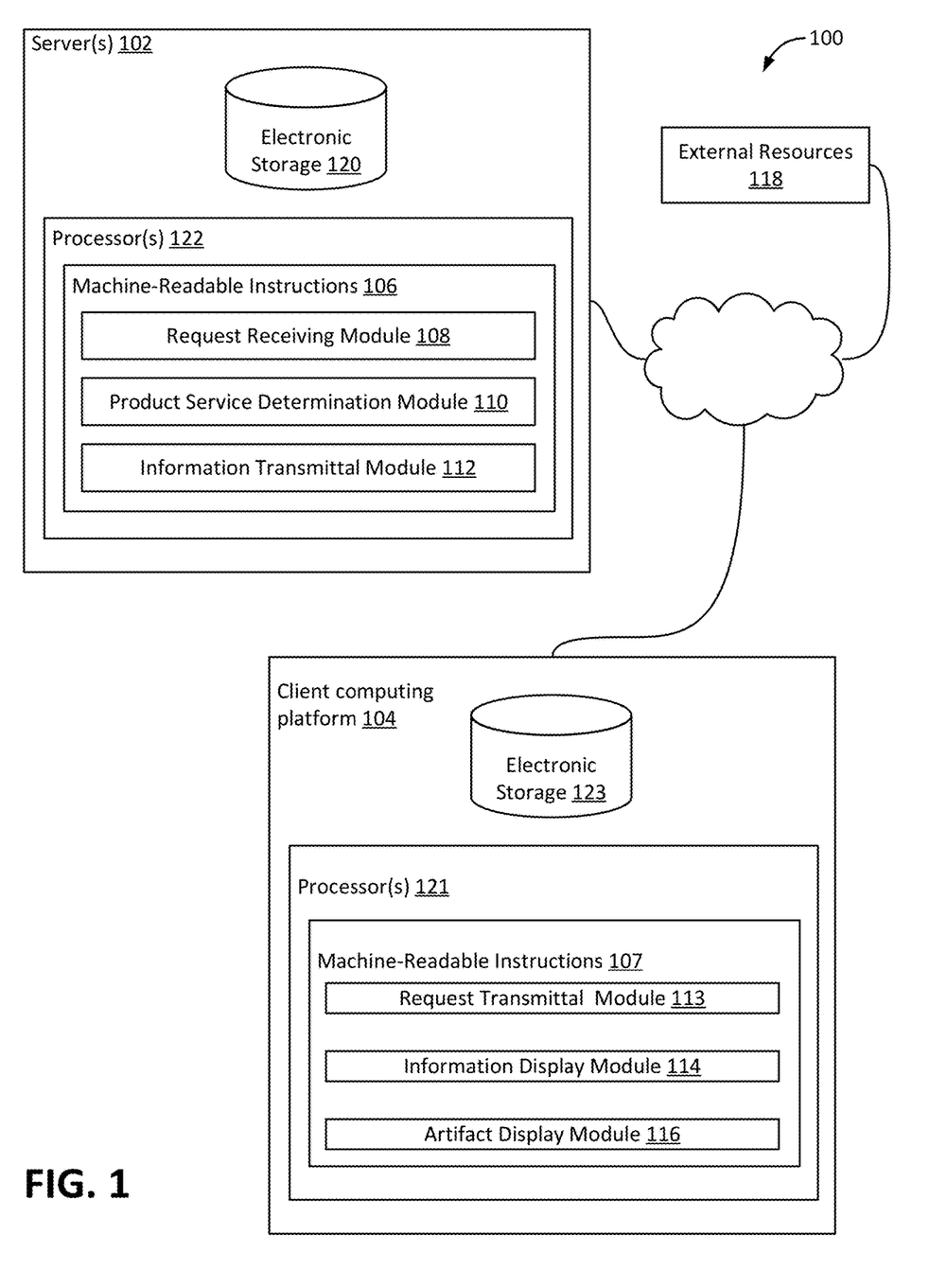
FIG. 1 illustrates a system configured for presenting information, related to products or services being shown on a second display device, on a first display device using augmented reality technology, in accordance with one or more implementations.

FIG. 1 illustrates a system 100 configured for presenting information, related to products or services being shown on a second display device, on a first display device using augmented reality technology, in accordance with one or more implementations. In some implementations, system 100 may include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures Users may access system 100 via client computing platform(s) 104.

Client computing platforms(s) 104 can be configured by machine readable instructions 107. Server(s) 102 can be configured by machine-readable instructions 106. Machine-readable instructions 106 may include one or more instruction modules. The instruction modules for server(s) 102 may include one or more of a request receiving module 108, a product service determination module 110, an information transmittal module 112, and instruction modules for client computing module(s) 104 may include a request transmittal module 113, an information display module 114, a dimensional artifact display module 116, and/or other instruction modules.

Request receiving module 108 can be configured to receive a request, by a server, from a processing system coupled to the first display device, to display information related to a product or service on an augmented reality marker present in a real-time or near real-time image generated in a viewpoint of an image capturing system. By way of non-limiting example, the image capturing system can be capable of capturing a color image data to an image sensor using at least one of a CCD (charge-coupled device) and/or CMOS (complementary metal-oxide semiconductor) to convert light into electrons, and a filter for obtaining a color image. In one or more implementations, the request is received from request transmittal module 113. The request may include identification information about a show or program channel on which the product or service is displayed on the second display device during a specific time period. Determining the product or service being shown on the second display device may include determining a timestamp at which the request was received, retrieving a catalog related to the show or program channel. The catalog may include details about the products or services being displayed on the second display device during the specific time period. Without limitation, the first or second display devices can be at least one of computing devices, mobile devices, Internet of Things (IoT) devices, televisions, gaming stations, augmented reality accessories (e.g., eye wear, glasses, contact lenses, etc.), or a combination thereof.

In one or more implementations, the specific period of time is defined by a user. In other implementations, the user can select a show (e.g., on demand television program, movie, etc.) and the server can, based on user selection, determine the specific time period. For example, if a user wants to see an on-demand show or program on the second display device, the user can select the show, movie, program channel, etc., using the first device, and the server can then determine the initialization of the specific time period based on user selection and display 3D artifacts to the user in synchronization with the on-demand show, movie or program channel. In other implementations, upon selection, the server can provide a list all artifacts to the user that are available (or associated) with the on demand program, movie, show, or program channel.

Determining the product or service being displayed on the second display device may further include determining another timestamp value related to each product or service scheduled to be displayed on the second displaying device during the specific time period and identifying the another timestamp value that is near or equal to the timestamp value at which the request was received. By way of non-limiting example, the processing system may detect feature descriptors of the real-time or near real-time image to identify the augmented reality marker using at least one of corner detection, blob detection, edge detection or thresholding algorithm. By way of non-limiting example, the feature descriptors can be invariant to image scale, rotation, illumination or noise in a viewpoint.

Product service determination module 110 can be configured to determine the product or service being shown on the second display device.

Information transmittal module 112 can be configured to transmit information related to the product or service. The information related to the product or service may include a three dimensional artifact that is to be augmented at the augmented reality marker to the processing system. The processing system may augment the image including the augmented reality marker with information related to the product or service and displays the information related to the product or service, including the three dimensional artifact, at the augmented reality marker on the first display device. Displaying the three dimensional artifact on the first display device may include receiving the real-time or near real-time image from the image capturing system, determining the augmented reality marker by at least one of determining occurrences of gradient orientation in localized portions of the real-time or near real-time image or identifying points in the real time or near real-time image.

For client computing platform(s) 104, request transmittal module 113 can be configured to transmit a request to receive information related to the product or service to be displayed on the first display device.

Artifact receiving module 114 can be configured to receive a 3D artifact. The 3D artifact may include metadata to indicate a center point of the 3D artifact and a rendering location with reference to the augmented reality marker. The center point of the 3D artifact can be determined using a two dimensional grid the location of the 3D artifact. The rendering location can be expressed in a coordinate system of the first display device. The metadata may further include a position and orientation of the 3D artifact in the coordinate system of the first display device using matrix transformation.

The coordinate system can be defined using a mapping of a viewpoint of the first display device. The 3D artifact can be augmented at the augmented reality marker.

Product service identifying module 116 can be configured to identify the product or service being displayed on the second display device.

In some implementations, the augmented reality marker can be identified at a location at which brightness of the real-time or near real-time image changes sharply or has discontinuities.

In some implementations, server(s) 102, client computing platform(s) 104, and/or external resources 118 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which server(s) 102, client computing platform(s) 104, and/or external resources 118 can be operatively linked via some other communication media.

A given client computing platform 104 may include one or more processors 121 configured to execute computer program modules (e.g., modules 113, 114, and/or 116, etc.). The computer program modules can be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 can be provided by resources included in system 100.

Server(s) 102 may include electronic storage 120, one or more processors 122, and/or other components. Client computing platforms(s) 104 may include electronic storage 123, one or more processors 121, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 can be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 can be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 121 and/or 122 is shown in FIG. 1 as a single entity, this is for illustrative purposes only. In some implementations, processor(s) 121 or 122 may include a plurality of processing units. These processing units can be physically located within the same device, or processor(s) 122 may represent processing functionality of a plurality of devices operating in coordination. At least one of processor(s) 121 or 122 can be configured to execute modules 108, 110, 112, 113, 114, 116, and/or other modules. Processor(s) 121 or 122 can be configured to execute modules 108, 110, 112, 113, 114, 116, and/or other modules by software; hardware; firmware; some combination of software, hardware, and/or firmware;

and/or other mechanisms for configuring processing capabilities on processor(s) 121 or 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, are illustrated in FIG. 1 as being implemented within a single processing unit, in implementations in which processor(s) 122 includes multiple processing units, one or more of modules 108, 110, and/or 112, can be implemented remotely from the other modules. Similarly, although modules 113, 114, and/or 116 are illustrated in FIG. 1 as being implemented within a single processing unit, in implementations in which processor(s) 121 includes multiple processing units, one or more of modules 113,114, and/or 116 can be implemented remotely from the other modules. The description of the functionality provided by the different modules 108, 110, 112, 113, 114, and/or 116 described below is for illustrative purposes, and is not intended to be limiting, as any of modules 108, 110, 112, 113, 114, and/or 116 may provide more or less functionality than is described. For example, one or more of modules 108, 110, 112, 113, 114, and/or 116 can be eliminated, and some or all of its functionality can be provided by other ones of modules 108, 110, 112, 113, 114, and/or 116. As another example, processor(s) 121 or 122 can be configured to execute one or more additional modules that may perform some or all of the functionality attributed below to one of modules 108, 110, 112, 113, 114, and/or 116.

Figure 2:
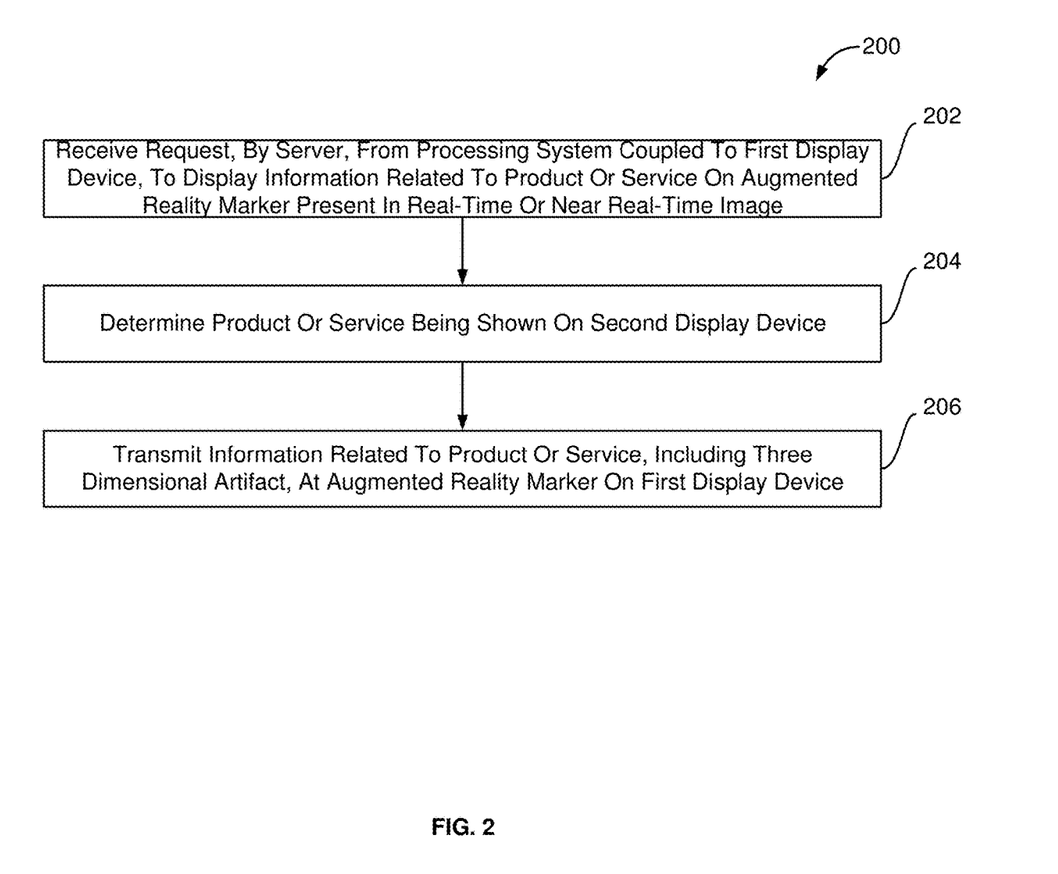
FIG. 2 illustrates a method for presenting information, by a server, related to products or services being shown on a second display device, on a first display device using augmented reality technology, in accordance with one or more implementations.

FIG. 2 illustrates a method 200 for presenting information, by a server, related to products or services being shown on a second display device, on a first display device using augmented reality technology, in accordance with one or more implementations. The operations of method 200 presented below are intended to be illustrative. In some implementations, method 200 can be accomplished with one or more additional operations not described, and/or without one or more of the operations discussed. Additionally, the order in which the operations of method 200 are illustrated in FIG. 2 and described below is not intended to be limiting.

In some implementations, method 200 can be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a request, by a server, from a processing system coupled to the first display device, to display information related to a product or service on an augmented reality marker present in a real-time or near real-time image generated in a viewpoint of an image capturing system. The request may include identification information about a show or program channel on which the product or service is displayed on the second display device during a specific time period. The processing system may detect feature descriptors of the real-time or near real-time image to identify the augmented reality marker using at least one of corner detection, blob detection, edge detection or thresholding algorithm. Operation 202 can be performed by one or more hardware processors configured by machine-readable instructions including a module that is the same as or similar to request receiving module 108, in accordance with one or more implementations.

An operation 204 may include determining the product or service being shown on the second display device. Operation 204 can be performed by one or more hardware processors configured by machine-readable instructions including a module that is the same as or similar to product service determination module 110, in accordance with one or more implementations.

An operation 206 may include transmitting information related to the product or service. The information related to the product or service may include a three dimensional artifact that is to be augmented at the augmented reality marker to the processing system. Operation 206 can be performed by one or more hardware processors configured by machine-readable instructions including a module that is the same as or similar to information transmittal module 112, in accordance with one or more implementations.

Figure 3:
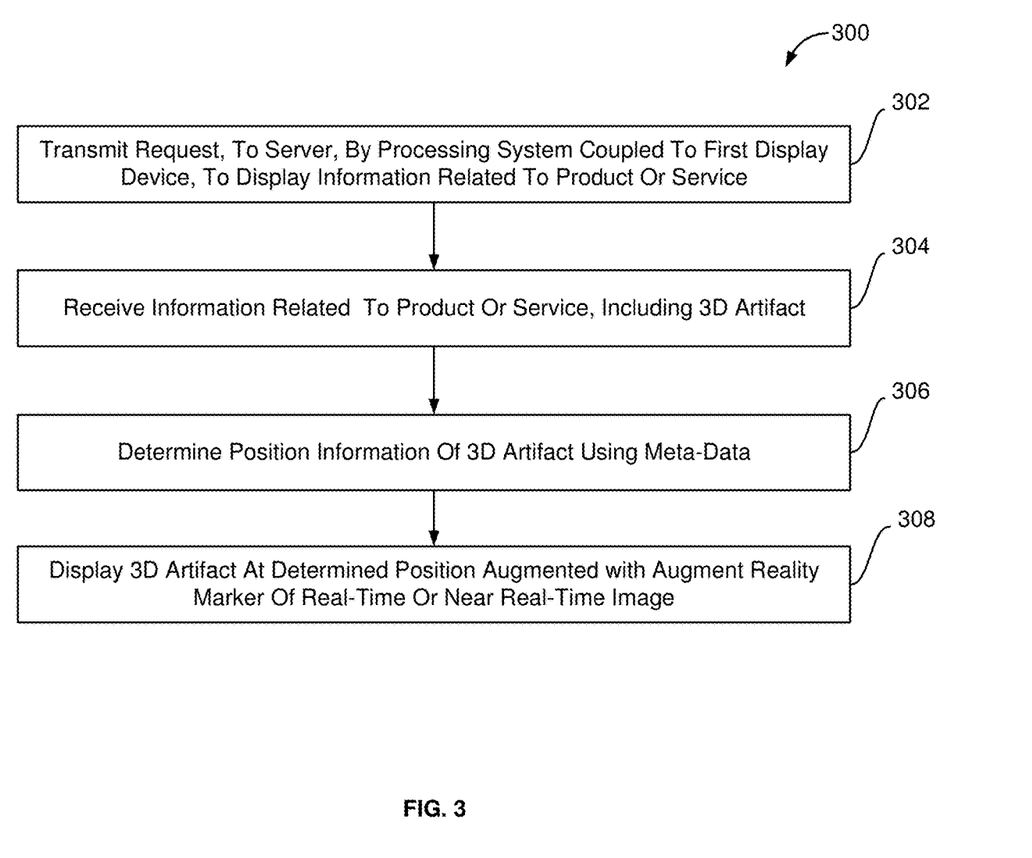
FIG. 3 illustrates a method for presenting information, by the processing system, related to products or services being shown on a second display device, on a first display device using augmented reality technology, in accordance with one or more implementations.

FIG. 3 illustrates a method 300 for presenting information, by the processing system, related to products or services being shown on a second display device, on a first display device using augmented reality technology, in accordance with one or more implementations. The operations of method 300 presented below are intended to be illustrative. In one or more implementations, at operation 302 the processing system may transmit a request to the server to display information related to a product or service on the first display device, the product or service being shown on the second display device during a specific time period. At operation 304, the processing system receives information related to the product or service. In one or more implementations, at operation 304, the processing system may also receive the 3D artifact that needs to augmented on to the real-time or near real-time image captured from the viewpoint of the image capturing system. At operation 306 the processing system determines a position of the 3D artifact. In one or more implementations this is performed based on meta-data associated with the 3D artifact. At operation 308, the processing system displays the 3D artifact at the determined position, augmenting the augment reality marker of the real-time or near real-time image with the 3D artifact.

Figure 4A:
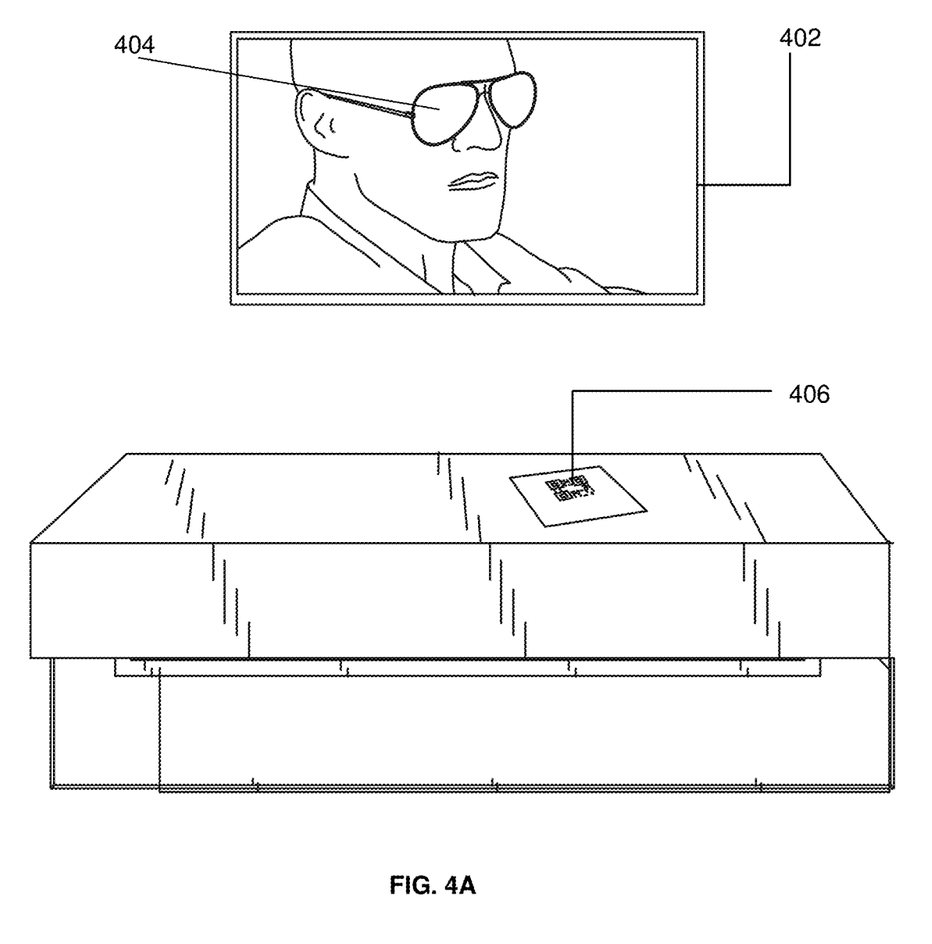
FIGS. 4A, 4B, and 4C illustrate an exemplary implementation of the techniques described herein.
Figure 4B:
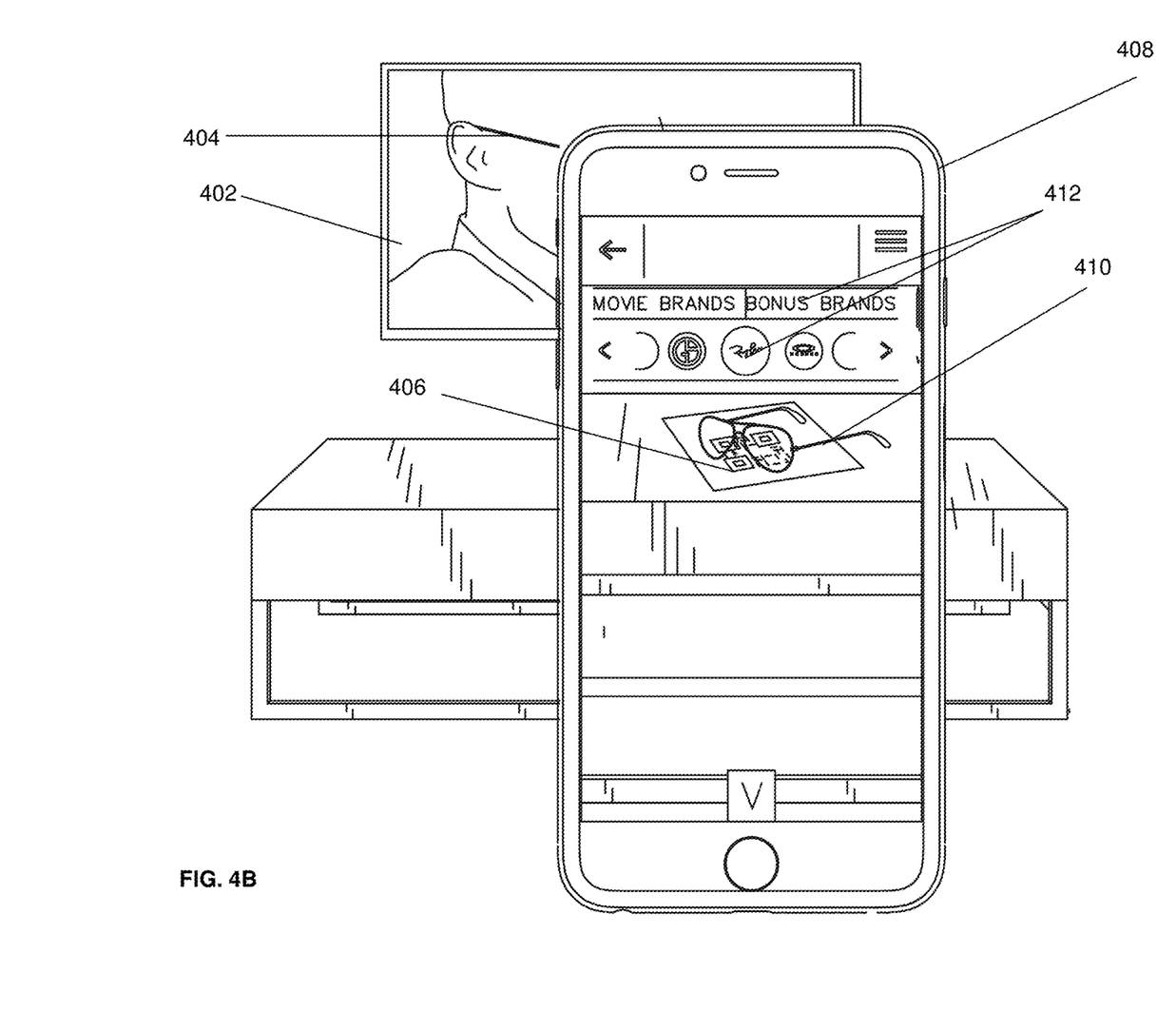
Figure 4C:
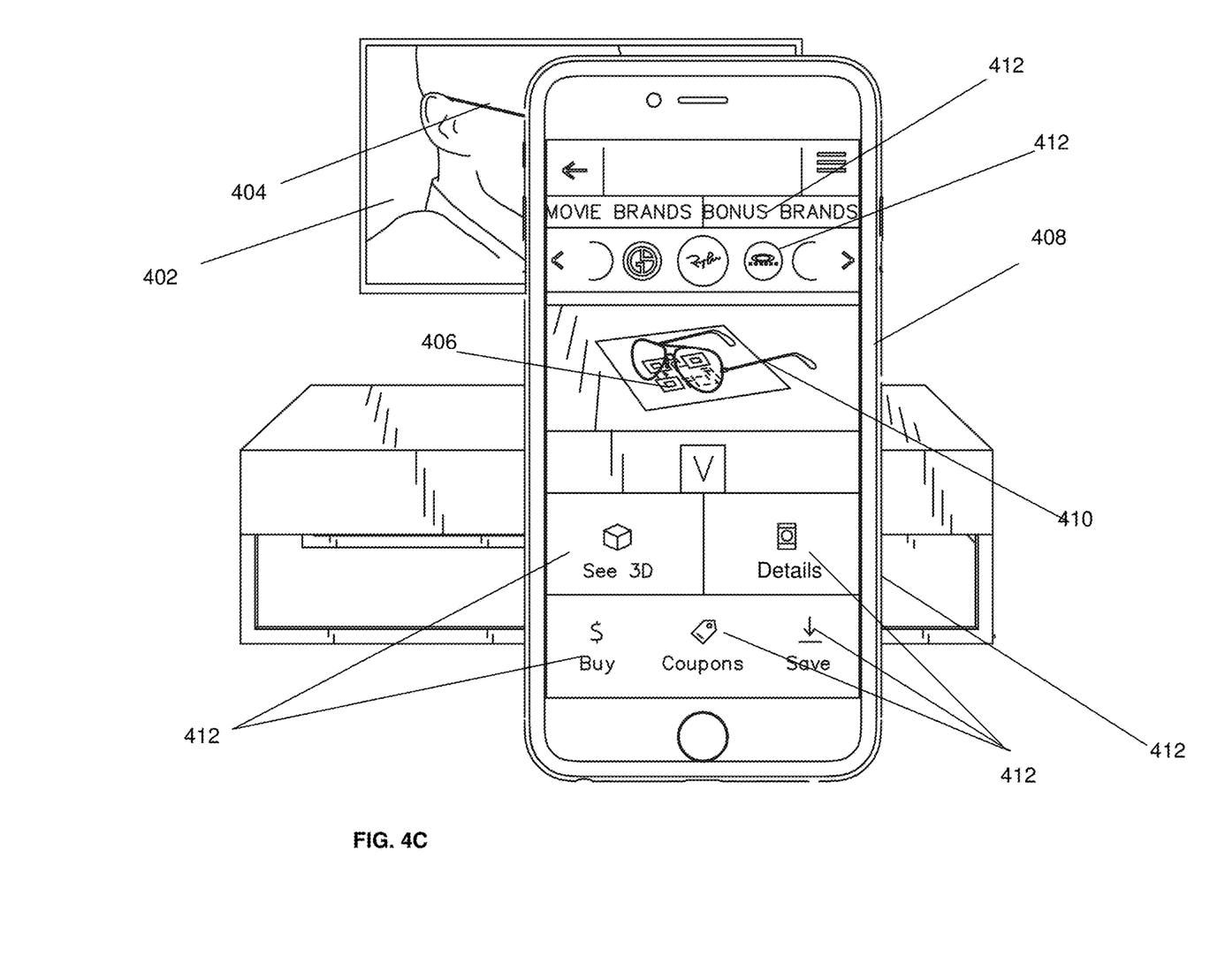

FIGS. 4A, 4B, and 4C illustrate an exemplary implementation of the techniques described herein. As illustrated, in FIG. 4A, second display device 402 shows product 404 at a specific period of time. In the exemplary environment, augmented reality marker 406 is presented in the real environment. For illustrative purposes only, the augmented reality marker is shown as a QR Code, however, a person of ordinary skill in the art would appreciate that any feature descriptor can be identified as the augmented reality marker (e.g., table, chair, or any other external environmental setting or feature) using the techniques described herein.

As illustrated, in FIG. 4B, an image capturing system associated with first display device 408 can be used to capture (or generate) a real-time or near real-time image of augmented reality marker 406. Thereafter, using the techniques described herein, information related to product 404 being shown on second display device 402, including 3D artifact 410 associated with product 404 can be augmented on to real-time or near real-time image and displayed on first display device 408. In one or more implementations, information related to product 404 being shown on second device 402 can include various other data. In one or more implementations, upon displaying 3D artifact 410 additional details 412 can be displayed as well. Additional details can include a list of all brands available (or shown) on the second display device during the specific time period and/or bonus brands that a viewer might be interested in.

As illustrated in FIG. 4C, first display device 408 can display additional details 412 along with 3D artifact 410. A user can then select one or many options associated with product 404 being displayed on second display device 402 at a specific period of time. Without limitation, options can include to view a three dimensional view of product 404, see additional details, purchase product, download coupons, save product information, see a list of additional products being shown on display device 402 during the specified time-period.

The specified time-period can be a fixed period of time during this a show or program channel is aired, streamed, or otherwise displayed on second display device 404. The show can be a television show, a movie, an advertisement, a television program, documentary, or any other airing or streaming. Therefore, information related to the product or service can also be augmented with information related to the show or program channel. For example, if the specific period of time is the duration of a movie, information related to the product or service can include other products or services included in the movie. In one or more implementations, this information can include a list of products or services being offered throughout the specific time period. Similarly, information related to bonus products or services can also be displayed on first display device 408.

Figure 5:
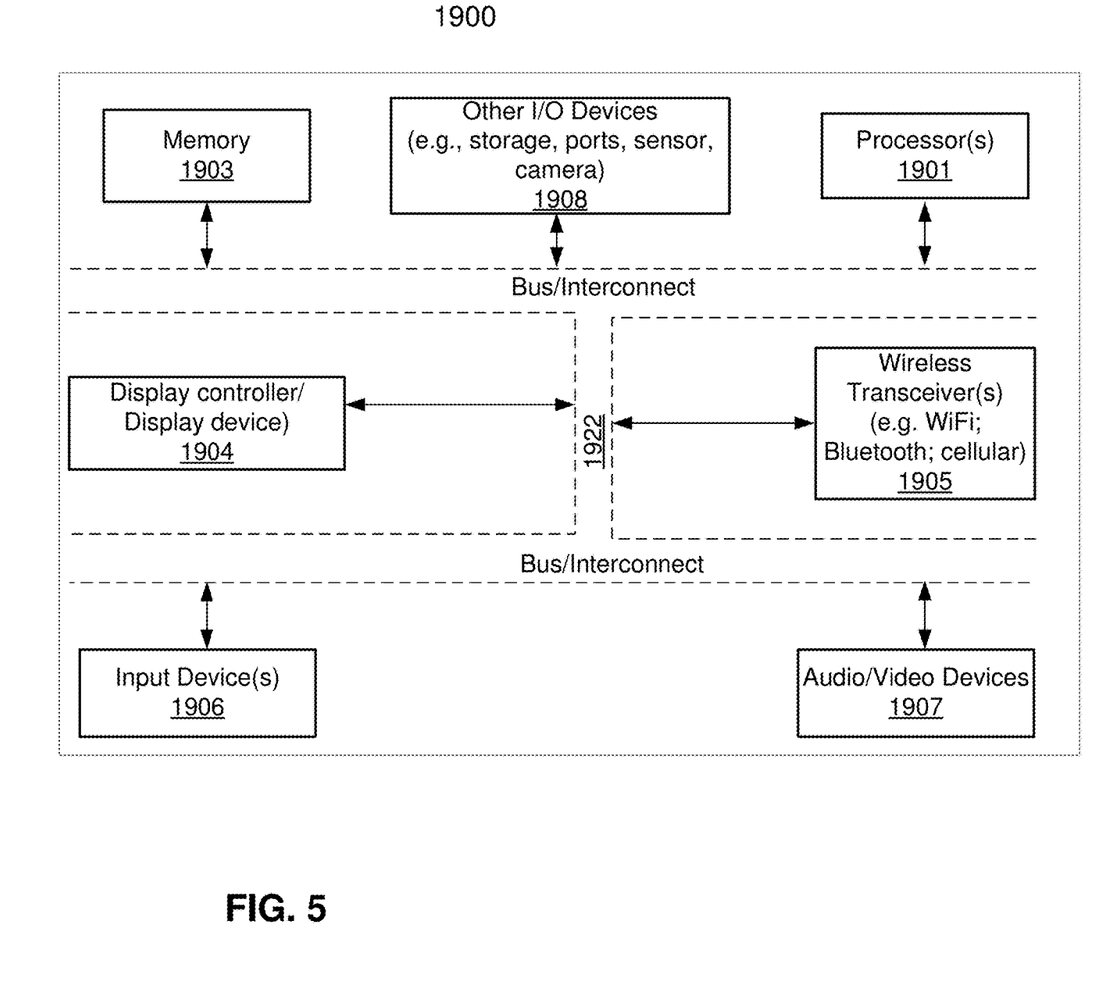
FIG. 5 illustrates a block diagram illustrating a data processing system that can be implemented with one or more implementations.

FIG. 5 illustrates a block diagram illustrating a data processing system 1900 that can be implemented with one or more implementations. For example, system 1900 can be implemented as part of server(s) 102 or client computing platform(s) 104, including the first or second display devices. It should be apparent from this description that aspects of the present invention can be embodied, at least in part, in software. That is, the techniques can be carried out in a computer system or other computer system in response to its processor, such as a microprocessor, executing sequences of instructions contained in memory, such as a ROM, DRAM, mass storage, or a remote storage device. In various implementations, hardware circuitry can be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

System 1900 can have a distributed architecture having a plurality of nodes coupled through a network, or all of its components can be integrated into a single unit. Computing system 1900 can represent any of the data processing systems described above performing any of the processes or methods described above. In one embodiment, computer system 1900 can be implemented as integrated circuits (ICs), discrete electronic devices, modules adapted to a circuit board such as a motherboard, an add-in card of the computer system, and/or as components that can be incorporated within a chassis/case of any computing device. System 1900 is intended to show a high level view of many components of any data processing unit or computer system. However, it is to be understood that additional or fewer components can be present in certain implementations and furthermore, different arrangement of the components shown may occur in other implementations. System 1900 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 can represent a single processor or multiple processors with a single processor core or multiple processor cores included therein. Processor 1901 can represent one or more general-purpose processors such as a microprocessor, a central processing unit (CPU), Micro Controller Unit (MCU), etc. Processor 1901 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1901, can also be a low power multi-core processor socket such as an ultra-low voltage processor, may act as a main processing unit and central hub for communication with the various components of the system. Such processor can be implemented as a system on chip (SoC).

Processor 1901 is configured to execute instructions for performing the operations and methods discussed herein. System 1900 further includes a graphics interface that communicates with graphics subsystem 1904, which may include a display controller and/or a display device. Processor 1901 can communicate with memory 1903, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. System 1900 can further include IO devices such as devices 1905-1908, including wireless transceiver(s) 1905, input device(s) 1906, audio IO device(s) 1907, and other IO devices 1908.

Wireless transceiver 1905 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1906 can include a mouse, a touch pad, a touch sensitive screen (which can be integrated with display device 1904), a pointer device such as a stylus, and/or a keyboard (e.g., physical keyboard or a virtual keyboard displayed as part of a touch sensitive screen). Other optional devices 1908 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1922 via a sensor hub (not shown), while other devices such as a keyboard or thermal sensor can be controlled by an embedded controller (not shown), dependent upon the specific configuration or design of system 1900.

To provide for persistent storage of information such as data, applications, one or more operating systems and so forth, in one embodiment, a mass storage (not shown) may also couple to processor 1901. In various embodiments, to enable a thinner and lighter system design as well as to improve system responsiveness, this mass storage can be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on Re-initiation of system activities. Also a flash device can be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
    one or more hardware processors configured by machine-readable instructions to:
        receive a request, by a server, from a processing system coupled to a first display device to display information related to a product or service on an augmented reality marker present in a real-time or near real-time image captured in a viewpoint of an image capturing system, wherein the processing system detects feature descriptors of the real-time or near real-time image to identify the augmented reality marker using at least one of corner detection, blob detection, edge detection or thresholding algorithm;
        determine a timestamp value at which the request is received from the processing system coupled to the first display device;
        determine another timestamp value related to a product or service scheduled to be displayed on a show or channel on the second displaying device; and
        transmit information related to the product or service to the first display device when the another timestamp value is near or equal to the timestamp value;
        wherein the processing system augments the real-time or near real-time image comprising the augmented reality marker with information related to the product or service.

2. The system of claim 1, wherein the augmented reality marker is identified at a location at which brightness of the real-time or near real-time image changes sharply or has discontinuities, and wherein the processing system displays the information related to the product or service, including a three dimensional (3D) artifact, at the augmented reality marker on the first display device.

3. The system of claim 2, wherein displaying the 3D artifact on the first display device includes:
    receive the real-time or near real-time image from the image capturing system;
    determine the augmented reality marker by at least one of determining occurrences of gradient orientation in localized portions of the real-time or near real-time image or identifying points in the real time or near real-time image; and
    receive the 3D artifact, the 3D artifact including metadata to indicate a center point of the 3D artifact and a rendering location with reference to the augmented reality marker;
    wherein the 3D artifact is augmented at the augmented reality marker.

4. The system of claim 3, wherein the center point of the 3D artifact is determined using a two dimensional grid of coordinates at the location of the 3D artifact.

5. The system of claim 3, wherein the rendering location can be expressed in a coordinate system of the first display device, and wherein the metadata further comprises a position and orientation of the 3D artifact in the coordinate system of the first display device using matrix transformation.

6. The system of claim 1, wherein to determine the product or service being shown on the second display device, the one or more hardware processors are further configured by machine-readable instructions to:
    retrieve a catalog related to the show or program channel, the catalog comprising details about the products or services being displayed on the second display device; and
    identify the product or service being displayed on the second display device.

7. A method, comprising:
receiving a request, by a server, from a processing system coupled to the first display device, to display information related to a product or service on an augmented reality marker present in a real-time or near real-time image captured in a viewpoint of an image capturing system, wherein the processing system detects feature descriptors of the real-time or near real-time image to identify the augmented reality marker using at least one of corner detection, blob detection, edge detection or thresholding algorithm;
determining a timestamp value at which the request is received from the processing system coupled to the first display device;
determining another timestamp value related to a product or service scheduled to be displayed on a show or channel on the second displaying device; and
transmitting information related to the product or service to the first display device when the another timestamp value is near or equal to the timestamp value;
wherein the processing system augments the image comprising the augmented reality marker with information related to the product or service and displays the information related to the product or service.

8. The method of claim 7, wherein the augmented reality marker is identified at a location at which brightness of the real-time or near real-time image changes sharply or has discontinuities, and wherein the processing system displays the information related to the product or service, including a three dimensional (3D) artifact, at the augmented reality marker on the first display device.

9. The method of claim 8, wherein displaying the 3D artifact on the first display device includes:
receiving the real-time or near real-time image from the image capturing system;
determining the augmented reality marker by at least one of determining occurrences of gradient orientation in localized portions of the real-time or near real-time image or identifying points in the real time or near real-time image; and
receiving the 3D artifact, the 3D artifact including metadata to indicate a center point of the 3D artifact and a rendering location with reference to the augmented reality marker;
wherein the 3D artifact is augmented at the augmented reality marker.

10. The method of claim 9, wherein the center point of the 3D artifact is determined using a two dimensional grid of coordinates at the location of the 3D artifact.

11. The method of claim 9, wherein the rendering location can be expressed in a coordinate system of the first display device, and wherein the metadata further comprises a position and orientation of the 3D artifact in the coordinate system of the first display device using matrix transformation.

12. The method of claim 7, wherein determining the product or service being shown on the second display device comprises:
retrieving a catalog related to the show or program channel, the catalog comprising details about the products or services being displayed on the second display device; and
identifying the product or service being displayed on the second display device.

13. A non-transitory computer-readable storage medium comprising instructions which when executed by one or more processors performs a method comprising:
receiving a request from a processing system coupled to the first display device, to display information related to a product or service on an augmented reality marker present in a real-time or near real-time image captured in a viewpoint of an image capturing system, wherein the processing system detects feature descriptors of the real-time or near real-time image to identify the augmented reality marker using at least one of corner detection, blob detection, edge detection or thresholding algorithm;
determining a timestamp value at which the request is received from the processing system coupled to the first display device;
determining another timestamp value related to a product or service scheduled to be displayed on a show or channel on the second displaying device; and
transmitting information related to the product or service to the first display device;
wherein the processing system augments the image comprising the augmented reality marker with information related to the product or service and displays the information related to the product or service, and
wherein the method is performed by a server computer.

14. The non-transitory computer-readable storage medium of claim 13, wherein the augmented reality marker is identified at a location at which brightness of the real-time or near real-time image changes sharply or has discontinuities, and wherein the processing system displays the information related to the product or service, including a three dimensional (3D) artifact, at the augmented reality marker on the first display device.

15. The non-transitory computer-readable storage medium of claim 13, wherein displaying the 3D artifact on the first display device includes:
receiving the real-time or near real-time image from the image capturing system;
determining the augmented reality marker by at least one of determining occurrences of gradient orientation in localized portions of the real-time or near real-time image or identifying points in the real time or near real-time image; and
receiving the 3D artifact, the 3D artifact including metadata to indicate a center point of the 3D artifact and a rendering location with reference to the augmented reality marker, wherein the 3D artifact is augmented at the augmented reality marker.

16. The non-transitory computer-readable storage medium of claim 13, wherein the image capturing system is capable of capturing a color image data to an image sensor using at least one of a CCD or CMOS, and a filter for obtaining a color image.

17. The non-transitory computer-readable storage medium of claim 13, wherein determining the product or service being shown on the second display device comprises:
retrieving a catalog related to the show or program channel, the catalog comprising details about the products or services being displayed on the second display device; and
identifying the product or service being displayed on the second display device.

* * * * *